US012596623B2

(12) United States Patent
Farkas et al.

(10) Patent No.: US 12,596,623 B2
(45) Date of Patent: Apr. 7, 2026

(54) DOUBLE DATA RATE HIGH VOLUME MANUFACTURING VARIATION TRENDS

(71) Applicant: DELL PRODUCTS L.P., Round Rock, TX (US)

(72) Inventors: Sandor Farkas, Round Rock, TX (US); Douglas Winterberg, York, SC (US); Bhyrav Mutnury, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/756,501

(22) Filed: Jun. 27, 2024

(65) Prior Publication Data

US 2026/0003755 A1      Jan. 1, 2026

(51) Int. Cl.
| | |
|---|---|
| *G06F 11/30* | (2006.01) |
| *G06F 11/00* | (2006.01) |
| *G06F 11/34* | (2006.01) |

(52) U.S. Cl.
CPC ........ *G06F 11/3041* (2013.01); *G06F 11/008* (2013.01); *G06F 11/3037* (2013.01); *G06F 11/3485* (2013.01); *G06F 11/349* (2013.01)

(58) Field of Classification Search
CPC .............. G06F 11/3041; G06F 11/008; G06F 11/3037; G06F 11/3485; G06F 11/349
See application file for complete search history.

(56) References Cited

U.S. PATENT DOCUMENTS

| | | | | |
|---|---|---|---|---|
| 2002/0052718 A1* | 5/2002 | Little | .................. | G06F 11/2257 714/1 |
| 2010/0191991 A1 | 7/2010 | Berke et al. | | |
| 2015/0081044 A1* | 3/2015 | Allen-Ware | .......... | G06F 11/008 700/28 |
| 2016/0269927 A1* | 9/2016 | Kim | ...................... | H04W 24/08 |
| 2020/0042391 A1* | 2/2020 | Pepper | ................ | G06F 11/1417 |
| 2020/0344264 A1* | 10/2020 | Wolfson | .............. | H04L 63/1491 |
| 2021/0382539 A1* | 12/2021 | Suryanarayana | ......... | G06F 8/65 |
| 2022/0276876 A1* | 9/2022 | Drury | ................... | G06F 21/572 |
| 2025/0045058 A1* | 2/2025 | Winterberg | ........... | G06F 9/4401 |

FOREIGN PATENT DOCUMENTS

TW        M435005 U   *  8/2012

OTHER PUBLICATIONS

Translation of TW-M435005-U (Year: 2012).*

* cited by examiner

Primary Examiner — Henry Tsai
Assistant Examiner — John B Roche
(74) Attorney, Agent, or Firm — Larson Newman, LLP

(57) ABSTRACT

An information handling system, comprising of a BMC, an I/O device, and a BIOS. The BIOS is configured to perform an I/O health check of the I/O device of the information handling system, gather I/O health check data from the I/O health check performed, and determine a health status of the information handling system according to a set of criteria and based on the I/O health check data.

20 Claims, 3 Drawing Sheets

300

Information Handling System

302 Processor

304 Processor

334 Video Display

320 Memory 310 306

322

308 332

330 336 Graphics Interface

Chipset

312

340 NVRAM
342 BIOS/ EFI

370 I/O Interface

350 Disk Controller

392

356

352

376 TPM

380 Network Interface

374 Add-On Resource

372

ODD

390 BMC

354

394

382

HDD

360 Disk Emulator 364 362

Solid State Drive

DOUBLE DATA RATE HIGH VOLUME MANUFACTURING VARIATION TRENDS

FIELD OF THE DISCLOSURE

The present disclosure generally relates to information handling systems, and more particularly relates to Double Data Rate (DDR) high volume manufacturing variation (HVM) trends.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system, comprising of a baseboard management controller (BMC), an input/output (I/O) device, and a Basic Input/Output System (BIOS). The BIOS is configured to perform an I/O health check of the I/O device of the information handling system, gather I/O health check data from the I/O health check performed, and determine a health status of the information handling system according to a set of criteria and based on the I/O health check data.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

Figure 1:
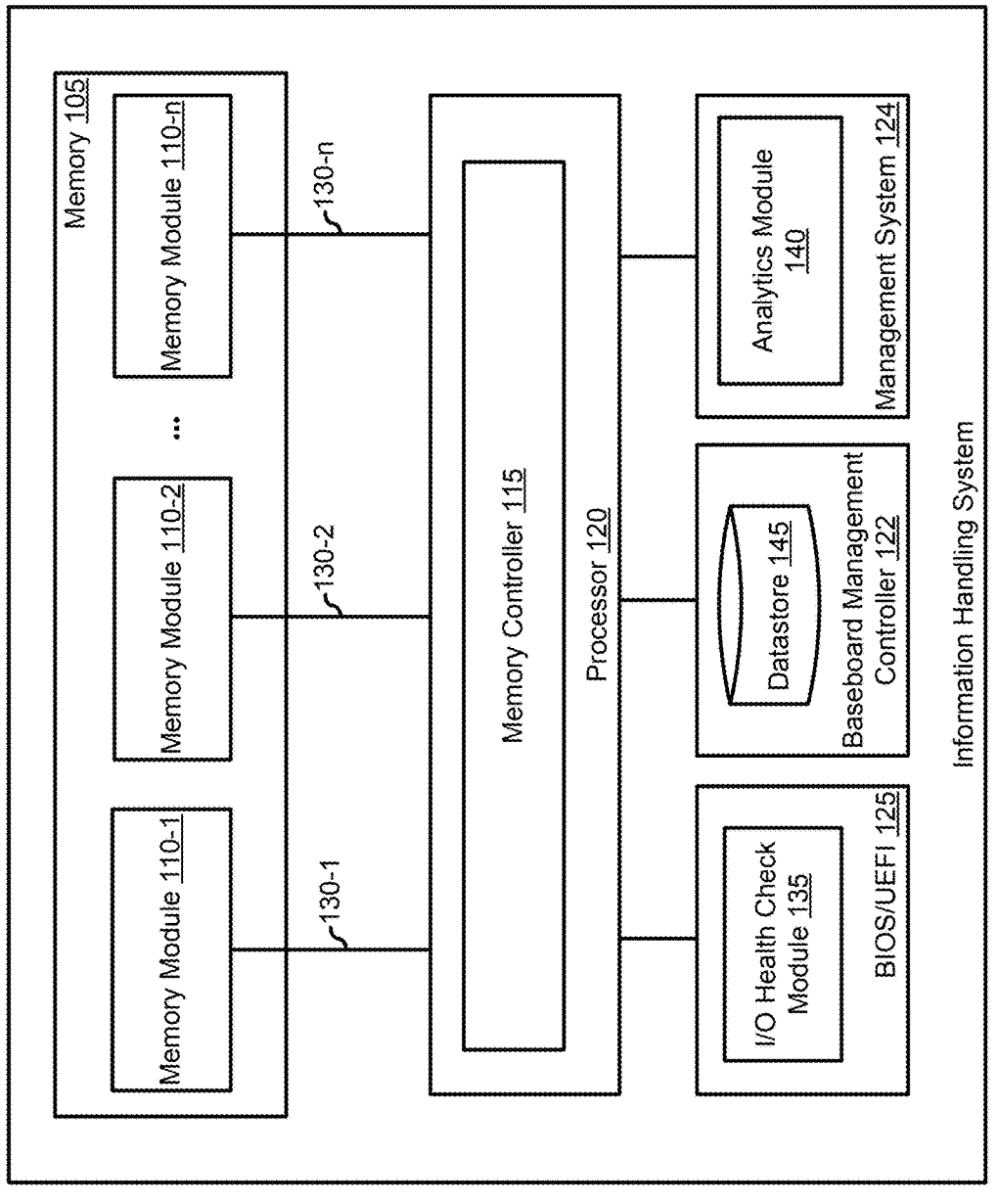
FIG. 1 is a block diagram of an information handling system, according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

In general, information handling systems include a processing device, a memory device for storing computer code that when executed by the processor, causes the information handling system to perform various operations on data, and a data storing device for storing the data. Memory modules are often configured on a circuit card, often referred to as a Dual In-Line Memory Module (DIMM). The information handling system includes various other pluggable circuit cards, such as Peripheral Component Interconnect (PCI) cards, DIMMs, etc. Certain information handling system devices, such as processing devices and pluggable circuit cards, generally plug into a connector slot or a socket. The connector slot typically includes several metal connectors for contacting corresponding connector pads on the devices.

With Double Data Rate (DDR) speeds approaching Peripheral Component Interconnect Express (PCIe) speeds of approximately 6.4 to 8 gigabits per second (Gbps), manufacturing variations have an impact on the signal integrity of information handling systems. Examples of these variations include variations in the DIMMs, such as variations in DIMM capacities, and variations in the DIMMs related to vendors or manufacturers. Other examples of these variations include variations in printed circuit boards (PCBs) and PCB laminate materials, socket variations, variations between connectors related to vendors or manufacturers, etc. Typically, attempts to capture these variations happen during the development phase of the information handling systems using simulations.

However, because these attempts are based typically on modeling results, proving, or disproving the accuracy of assumptions used during the simulations is difficult. This is generally because of the difficulty of gathering data from real-world settings. Thus, accounting for HVM variations with input/output (I/O) devices and/or interfaces during the development of an information handling system to account for fifth-generation DDR (DDR5) or sixth-generation (DDR6) technology is difficult. As such, a designer of information handling systems may typically design with the worst-case stack-up of all of the known HVM variations to ensure that the systems manufactured are sound.

However, such worst-case stack-up design may result in designs that are too conservative, leading to over-design of the information handling system. For example, the designer may use more expensive components that can handle the worst-case stack-up. Further, gathering data on information handling systems during the manufacturing process is typically cumbersome and inaccurate, particularly when sample sizes (that is, production run sizes) are small. As such, capturing real-time I/O data from various information handling systems may be advantageous for the designer to push design margins with aggressive thresholds instead of relying on conservative designs. In addition, the designer may also use the real-time I/O data to save cost, push plan of record (POR) DDR speeds, save power and drive performance.

FIG. 1 shows a portion of an information handling system 100, according to an embodiment of the present disclosure. Information handling system 100, which is similar to information handling system 300 of FIG. 3, includes a memory 105, a processor 120, a basic input and output system/ Unified Extensible Firmware Interface (BIOS/UEFI) 125, a baseboard management controller (BMC) 122, and a management system 124. BIOS/UEFI 125 includes an I/O health check module 135. BMC 122 includes a datastore 145. Management system 124 includes an analytics module 140. Memory 105 includes memory modules 110-1 through 110-*n*. Processor 120 includes a memory controller 115. Memory controller 115 may be coupled with memory modules 110 via memory channels 130-1 through 130-*n*. Memory controller 115, memory 105 with memory modules 110, and memory channels 130 may be referred to as a memory subsystem. Processor 120 is communicatively coupled to BIOS/UEFI 125, BMC 122, and management system 124. However, any variety of connections between memory modules 110, processor 120, BMC 122, and BIOS/UEFI 125 are envisioned as falling within the scope of the present disclosure.

Figure 3:
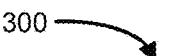
FIG. 3 is a block diagram of a generalized information handling system, according to an embodiment of the present disclosure.

Memory 105, which is similar to memory 320 of FIG. 3, may comprise any system, device, or apparatus operable to retain program instructions or data for a period of time and may represent a main memory of information handling system 100. Memory 105 includes memory modules 110 which may be comprised of DDR5 or DDR6 DIMMs. Alternatively, memory modules 110 may comprise of single in-line memory modules (SIMMs), Small Outline DIMMs (SODIMM), MicroDIMMs, Compression Attached Memory Modules (CAMM), or any other type of memory module. Each one of memory modules 110 may be a Peripheral Component Interconnect-Express (PCIe), serial Advanced Technology Attachment (SATA), DDR5, DDR6, or the like. Memory modules 110 may be coupled to sockets that include electrical contracts that are configured to mate with pins of memory modules 110.

Memory modules 110 may be configured to utilize various features of Joint Electron Devices Engineering Council (JEDEC) standard or future standards for various memory types and sockets, respectively. Each memory module may be communicatively coupled to memory controller 115 via memory channels 130. Memory channels 130 may be configured to support one, two, three, or more sockets per channel. Further, although three channels are shown, fewer channels or additional channels may be communicatively coupled to memory controller 115. Each one of memory channels 130 may include a command/address (CMD/ADR) control bus, a clock for timing of signals on a CMD/ADR bus, a data (DQ) bus, and a data strobe (DQS) for the signals on the DQ line. Accordingly, memory channels 130 may be configured to carry data and command signals between the memory controller 115 and memory 105. In addition, the sockets may conform to the DDR DIMM standards, such as DDR5/DDR6 DIMM standards by the JEDEC. The sockets may also conform to a future JEDEC standard, another memory standard, or a proprietary design.

Processor 120, which is similar to processors 302 and 304 of FIG. 3, may comprise any system, device, or apparatus operable to interpret and/or execute program instructions and/or process data, microcontroller, digital signal processor, application-specific integrated circuit, or any other digital signal processor, application specific integrated circuit, or any other digital or analog circuitry configured to interpret and/or execute program instructions and/or process data stored in memory 105 and/or another component of information handling system 100. In one example, processor 120 may be a CPU. Processor 120 may be coupled to a socket, which provides a mechanical and electrical connection between processor 120 and a PCB.

Memory controller 115 may be any system, device, or apparatus configured to manage data storage and retrieval operations from memory 105. In particular, memory controller 115 may represent a portion of information handling system 100 that operates to manage the flow of information to memory modules 110. For example, memory controller 115 may be configured to read data from and/or write data to memory modules 110. Memory controller 115 and memory modules 110 may operate in accordance with a memory architecture implemented on information handling system 100. For example, memory controller 115 and memory modules 110 may operate in accordance with a DDR standard such as a JEDEC DDR5 or DDR6 standard. It will be understood that, where memory controller 115 and memory modules 110 operate in accordance with a different DDR standard, then memory controller 115 and memory modules 110 may be configured to provide different numbers of separate memory channels as compared to FIG. 1 without varying from the scope of this disclosure. In addition, although memory controller 115 is shown as a component of processor 120, memory controller 115 may be separate from processor 120 and/or may be an integral portion of another component of information handling system 100. For example, memory controller 115 may be integrated into memory 105.

BIOS/UEFI 125, which is similar to BIOS/EFI module 342 of FIG. 3, may include any system, device, or apparatus configured to identify, test, and/or initialize information handling resources of information handling system 100, and/or initialize interoperation of information handling system 100 with other information handling systems. "BIOS" may broadly refer to any system, device, or apparatus configured to perform such functionality, including without limitation, a UEFI. Accordingly, for purposes of this disclosure, extensible firmware interface (EFI) and unified EFI (UEFI) are used interchangeably and called UEFI for simplicity. Also, as used herein, legacy BIOS, as well as BIOS/UEFI, are referred to as BIOS for simplicity.

In some embodiments, BIOS/UEFI 125 may be implemented as a program of instructions that may be read by and executed on processor 120. In these and other embodiments, BIOS/UEFI 125 may comprise boot firmware configured to be the first code executed by processor 120 when information handling system 100 is booted and/or powered on. For example, BIOS/UEFI 125 may be configured to initialize memory 105 in a predefined manner according to JEDEC specification at power on of information handling system 100. In particular, BIOS/UEFI 125 may operate to execute a memory reference code that reads information related to the configuration and capabilities of memory modules 110 and set up the operating properties of memory modules 110 and of memory controller 115 to ensure proper operation of memory controller 115 and memory modules 110. For example, BIOS/UEFI 125 may be configured to perform CMD/ADR write leveling to allow memory controller 115 to compensate for skew. Further, BIOS/UEFI 125 may be configured to perform write/read training which includes leveling data (DQ) and data strobe (DQS) signal classes. The write/read training may also include reference voltage (Vref) training to determine a range of Vref values where a memory interface is stable. In addition, the write/read training includes calibration of delay registers.

I/O health check module 135 may be configured to provide monitoring and health check operations for various I/O types within information handling system 100, such as a PCIe, SATA, DDR5, DDR6, etc. In particular, I/O health check module 135 may be configured to collect various operating parameters that are set up for different I/O interfaces by BIOS/UEFI 125 during a system boot phase to determine a health status of information handling system 100 and its components, such as whether or not a particular I/O interface is set up to operate within predetermined operating parameters for that I/O interface For example, I/O health check module 135 may monitor some operating parameters during the memory initialization process. I/O health check module 135 may also monitor other operating parameters, such as CMD/ADR control bus parameters, write leveling parameters, data bus read/write training parameters, like channel margins that include timing margins, read/write voltage margins, temperature margins, or the like. I/O health check module 135 may also take a few milliseconds to capture and approximate a DDR threshold parameter, which is typically set by design based on validation of the DDR or I/O simulations. For example, various memory transactions may be simulated during a new product introduction (NPI) phase of the information handling system.

I/O health check module 135 may be configured to evaluate whether the system is "healthy" or "marginal" during the manufacture or operation of information handling system 100 based on a set of criteria. The set of criteria may include a DDR threshold, speed limit, performance limit, channel margins, DDR margins, etc. For example, information handling system 100 may be deemed suitable for delivery to end users when information handling system 100 is deemed to be healthy based on the set of criteria during manufacture. On the other hand, when information handling system 100 may be deemed unsuitable for delivery to end users when the information handling system is deemed marginal during manufacture based on the set of criteria. In a particular example, an information handling system and/or its I/O or memory subsystem may be deemed healthy if its current channel margins exceed expected DDR or channel margins by a pre-defined upper threshold. In addition, an information handling system and/or its I/O or memory subsystem may be deemed marginal if its current DDR or channel margins underperform expected channel margins by a pre-defined lower threshold. Further, I/O health data can also be used to understand settings used on I/O components or devices of healthy and/or marginal systems. This may also show operating ranges of channel and/or DDR margins for healthy and/or marginal systems.

In a particular embodiment, data from I/O health check module 135 may be utilized throughout the lifecycle of information handling system 100. For example, I/O health check module 135 may be invoked during manufacture prior to delivery. In addition, I/O health check module 135 may be routinely invoked, such as during any system boot phase of information handling system 100. I/O health check module 135 may also be periodically invoked, such as once a week, once a month, or another period as needed or desired, or may be otherwise invoked during the lifecycle of information handling system 100 to gather data for information handling system 100. The I/O health status data from I/O health check module 135 may be provided as an I/O health check log and stored in datastore 145 of BMC 122, which is similar to BMC 390 of FIG. 3. Datastore 145 is a storage system that supplies data storage services to components of information handling system 100 such as BMC 122 and management system 124, wherein the components may be attached directly to information handling system 100 or through a network.

In turn, BMC 122 may provide the I/O health check log or a report to management system 124 for analysis. In addition, BMC 122, and/or management system 124 may also provide the I/O health check log to a management system of the manufacturer of information handling system 100, wherein the management system may also receive the I/O health check logs or reports from BMCs of other information handling systems for further analysis. Accordingly, a designer may utilize the data from a plurality of information handling systems to perform various statistical and regression analyses to detect trends associated with healthy and/or marginal information handling systems. Based on the analyses, the information may be utilized during the design phase of future platforms, such as to determine whether cheaper components or materials, such as PCB, PCB laminate materials, etc. can be used, like from other vendors. The designer may also determine whether slower components, such as memory modules or I/O interface may be used instead of the fastest memory modules or I/O interfaces available. In addition, the information may be analyzed to determine if some information handling systems in the field can be pushed to POR speeds or performance based on the DDR and/or channel margins. Further, the information can also be used to optimize power settings based on healthy margins, wherein the healthy margins can be used to decrease the validation of future platforms.

Management system 124 may be configured to provide access to a range of asset management functions and support systems to assist information technology professionals in providing and managing associated with managed assets, such as information handling system 100. Management system 124 may be configured to collect the I/O health check log for analysis to detect trends in the I/O health status of multiple information handling systems to detect trends in manufacturing robustness, or the like. In particular, management system 124 may include an analytics module 140 that is configured to receive the I/O health status from information handling system 100 and/or other information handling systems and perform various statistical and regression analyses. In this regard, management system 124 may be configured to retrieve additional information from information handling system 100, such as model type, installed components, lot, vendor, and date code information on various components of information handling system 100, such as processors, PCBs, memory modules, DDR thresholds, PCB laminate materials, or the like.

Management system 124 may transmit the I/O health data to a similar management system of the manufacturer for similar analyses of a plurality of I/O health logs among a plurality of information handling systems to detect HVM trends and determine design improvements for information handling systems. For example, the analyses may help the manufacturer determine realistic targets for various thresholds, such as DDR thresholds, instead of designing for conservative or worst-case scenarios. In addition, the manufacturer may identify DDR threshold sensitivities over HVM trends. The manufacturer may also establish HVM trends associated with DDR I/O margins or other HVM trends, which can help a designer engineer in refining information handling system designs while avoiding costly over-designs. Instead of over-designing, the information handling system may be designed based on real-world settings and may be able to tolerate cheaper alternative components or devices that are capable of handling such real-world settings. For example, based on vendor specifications, the manufacturer's management system may determine whether there are cheaper components, such as memory modules, sockets, PCBs, or PCB laminate materials may be used instead without sacrificing the quality of the information handling systems while still resulting in healthy systems.

Analytics module 140 may be configured to retrieve I/O health check data associated with memory 105, processor 120, and/or other I/O devices of information handling system 100. For example, analytics module 140 may collect data on a plurality of parameters indicative of memory modules 110, processor 120, and/or other devices that are seated in a socket. The data collected may be stored in datastore 145 and/or a cloud datastore, which may be accessible by a management system of the manufacturer of information handling system 100 and/or various vendors. Analytics module 140 may also have access to various vendors or manufacturers or I/O components and/or devices, such as their specifications. Analytics module 140 may calculate one or more margins based on the I/O health check data. Analytics module 140 may be configured to determine whether a system is healthy, or marginal based on analysis based on a set of criteria. The criteria may include DDR and/or channel margins associated with healthy systems. The criteria may also include DDR and/or channel margins associated with marginal systems. The criteria may be based on the platform, DDR technology of memory modules 110, DDR channel and speed, processor type, etc.

The I/O health check data in the I/O health check log may be utilized throughout the lifecycle of information handling system 100 to monitor for excursions from the previously experienced normal system behavior. The excursions may be determined based on a predetermined threshold for the various operating parameters, on a percentage or ratio of the previously expected norm, or another basis, as needed or desired. In a particular case, several thresholds, percentages, or ratios may be established, to provide a graded indication of the I/O health status of the monitored I/O interfaces, such as by providing an alert indication for minor excursions, a watch indication for moderate excursions, a warning indication for large excursions, and a failure indication for catastrophic excursions. Such indications are provided by BMC 122 to management system 124 to bring the status information to the attention of a system administrator. In this way, information handling system 100 is tracked to identify the likelihood of imminent failures, and the system administrator can take preventative measures to avoid system downtime by replacing failing components, or the like.

Those of ordinary skill in the art will appreciate that the configuration, hardware, and/or software components of information handling system 100 depicted in FIG. 1 may vary. For example, the illustrative components within information handling system 100 are not intended to be exhaustive but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 2:
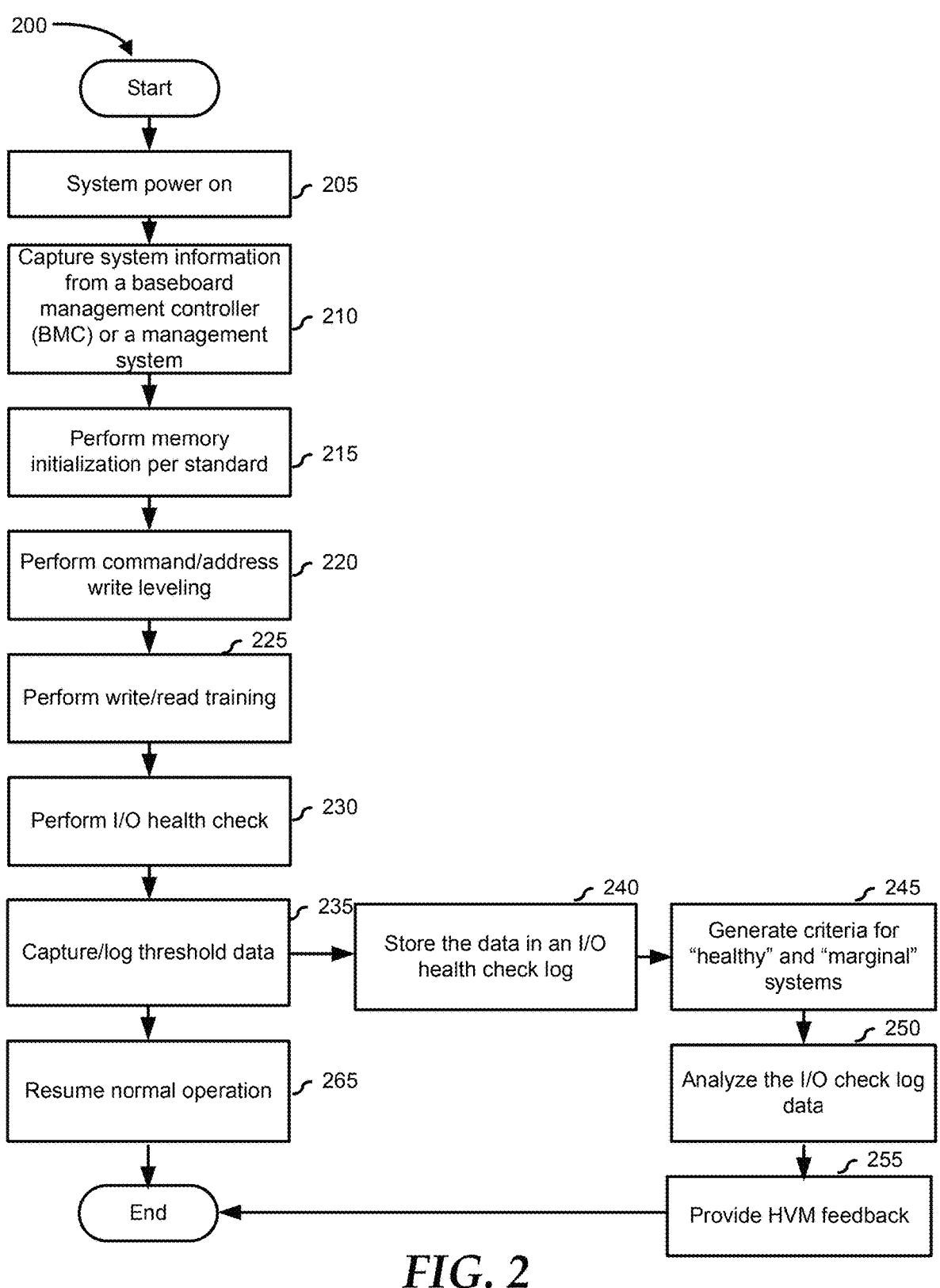
FIG. 2 is a flowchart of a method for improving Double Data Rate (DDR) high volume manufacturing variation (HVM) trends, according to an embodiment of the present disclosure.

FIG. 2 shows a flowchart of a method 200 for improving DDR HVM trends, according to an embodiment of the present disclosure. Method 200 may be performed by any suitable component of information handling system 100 of FIG. 1 including, but not limited to, BIOS/UEFI 125. It will be readily appreciated that not every method step set forth in this flow diagram is always necessary and that certain steps of the methods may be combined, performed simultaneously, in a different order, or perhaps omitted, without varying from the scope of the disclosure. While embodiments of the present disclosure are described in terms of information handling system 100 of FIG. 1, it should be recognized that other systems may be utilized to perform the described method. One of skill in the art will appreciate that this sequence diagram explains a typical example, which can be extended to applications or services in practice.

Method 200 typically starts at block 205 in which an information handling system is powered on. When information handling system 100 is powered on a BIOS/UEFI performs a power-on self-test (POST) during a system boot process. During the POST, the BIOS/UEFI may perform several predefined procedures to ensure that the memory subsystem is configured to provide an optimal level of data transmission reliability.

The method proceeds to block 210 where the BIOS/UEFI may capture system information from a BMC or a management system. The system information may include various information, such as the capacity of the memory modules, memory module types, memory module vendors, DDR technology, PCB vendor, sockets capacity, and PCB laminate materials. The method proceeds to block 215 where the BIOS/UEFI may perform memory initialization according to a JEDEC standard or other relevant standards. For example, during the memory initialization, the BIOS/UEFI may issue load memory registers with values defined in settings.

The method proceeds to block 220 where the BIOS/UEFI may perform CMD/ADR write leveling. The method then proceeds to block 225 where TxDq/RxDqs write/read training may be performed. Other I/O interface initializations may also be performed or desired. The method proceeds to block 230 where an I/O health check module may be invoked to perform an I/O health check of the information handling system and/or its components. For example, the I/O health check module may issue one or more commands to perform an I/O health check on I/O devices, such as the memory modules, CPUs, etc. of the information handling system. Further, the I/O health check module may monitor the setup parameters of the I/O interface of the information handling system.

The method proceeds to block 235 where the BIOS/UEFI may capture or log thresholds, such as DDR or channel margin thresholds that may have been set by a design engineer based on validation and/or simulations. The BIOS/UEFI may also log other information, such as settings, channel margins, performance, and configurations of I/O interfaces. The thresholds may be logged in an I/O health check log and stored in the BMC or the management system at block 240.

At block 245, BIOS/UEFI may generate a set of criteria for "healthy" and "marginal" systems. The criteria may be based on one or more parameters, such as the platform, DDR technology of memory modules, DDR channel and speed, processor type, etc. For example, a different set of criteria may be established for I/O devices associated with DDR5 technology versus I/O devices associated with DDR6 technology. In another example, an upper limit and/or a lower limit for each one of the channel margins, such as DDR margins, timing margins, read/write voltage margins, temperature margins, or the like may be generated. Other criteria, such as those related to the speed or performance of various components of the information handling system may also be generated.

At block 250, analysis of the I/O check log data may be performed to determine the impact on the HVM trends of information handling systems. For example, the I/O health check log data may be analyzed to understand the settings and/or components associated with the DDR for healthy systems and/or marginal systems. As such, the information may be used to establish a database of HVM trends of DDR I/O and/or margins of healthy and marginal systems at block 265 where normal operation may resume. In addition, the analysis may also determine impacts on the HVM of the information handling systems. A recommendation to improve the health status of marginal systems may also be provided. For example, a recommendation to swap or replace memory modules of a marginal system may be given. At block 255, feedback may be provided to the manufacturer of the information handling system based on the analysis. As such, instead of designing for worst-case scenarios, a design engineer may design for healthy systems based on real-world data.

FIG. 3 illustrates an embodiment of an information handling system 300 including processors 302 and 304, a chipset 310, a memory 320, a graphics adapter 330 connected to a video display 334, a non-volatile RAM (NVRAM) 340 that includes a basic input and output system/extensible firmware interface (BIOS/EFI) module 342, a disk controller 350, a hard disk drive (HDD) 354, an optical disk drive (ODD) 356, a disk emulator 360 connected to a solid-state drive (SSD) 364, an I/O interface 370 connected to an add-on resource 374 and a trusted platform module (TPM) 376, a network interface 380, and a BMC 390. Processor 302 is connected to chipset 310 via processor interface 306, and processor 304 is connected to the chipset via processor interface 308. In a particular embodiment, processors 302 and 304 are connected together via a high-capacity coherent fabric, such as a HyperTransport link, a QuickPath Interconnect, or the like. Chipset 310 represents an integrated circuit or group of integrated circuits that manage the data flow between processors 302 and 304 and the other elements of information handling system 300. In a particular embodiment, chipset 310 represents a pair of integrated circuits, such as a northbridge component and a southbridge component. In another embodiment, some or all of the functions and features of chipset 310 are integrated with one or more of processors 302 and 304.

Memory 320 is connected to chipset 310 via a memory interface 322. An example of memory interface 322 includes a DDR memory channel and memory 320 represents one or more DDR DIMMs. In a particular embodiment, memory interface 322 represents two or more DDR channels. In another embodiment, one or more of processors 302 and 304 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 320 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 330 is connected to chipset 310 via a graphics interface 332 and provides a video display output 336 to a video display 334. An example of a graphics interface 332 includes a PCIe interface and graphics adapter 330 can include a four-lane (×4) PCIe adapter, an eight-lane (×8) PCIe adapter, a 16-lane (×16) PCIe adapter, or another configuration, as needed or desired. In a particular embodiment, graphics adapter 330 is provided down on a PCB. Video display output 336 can include a Digital Video Interface (DVI), a High-Definition Multimedia Interface (HDMI), a DisplayPort interface, or the like, and video display 334 can include a monitor, a smart television, an embedded display such as a laptop computer display, or the like.

NVRAM 340, disk controller 350, and I/O interface 370 are connected to chipset 310 via an I/O channel 312. An example of I/O channel 312 includes one or more point-to-point PCIe links between chipset 310 and each of NVRAM 340, disk controller 350, and I/O interface 370. Chipset 310 can also include one or more other I/O interfaces, including a PCIe interface, an Industry Standard Architecture (ISA) interface, a Small Computer Serial Interface (SCSI) interface, an Inter-Integrated Circuit (I²C) interface, a System Packet Interface, a Universal Serial Bus (USB), another interface, or a combination thereof. NVRAM 340 includes BIOS/EFI module 342 that stores machine-executable code (BIOS/EFI code) that operates to detect the resources of information handling system 300, to provide drivers for the resources, to initialize the resources, and to provide common access mechanisms for the resources. The functions and features of BIOS/EFI module 342 will be further described below.

Disk controller 350 includes a disk interface 352 that connects the disc controller to a hard disk drive (HDD) 354, to ODD 356, and to disk emulator 360. An example of disk interface 352 includes an Integrated Drive Electronics (IDE) interface, an Advanced Technology Attachment (ATA) such as a parallel ATA (PATA) interface or a SATA interface, a SCSI interface, a USB interface, a proprietary interface, or a combination thereof. Disk emulator 360 permits SSD 364 to be connected to information handling system 300 via an external interface 362. An example of external interface 362 includes a USB interface, an institute of electrical and electronics engineers (IEEE) 1394 (Firewire) interface, a proprietary interface, or a combination thereof. Alternatively, SSD 364 can be disposed within information handling system 300.

I/O interface 370 includes a peripheral interface 372 that connects the I/O interface to add-on resource 374, to TPM 376, and to network interface 380. Peripheral interface 372 can be the same type of interface as I/O channel 312 or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral interface 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board, or add-in card disposed within information handling system 300, a device that is external to the information handling system, or a combination thereof.

Network interface 380 represents a network communication device disposed within information handling system 300, on a main circuit board of the information handling system, integrated onto another component such as chipset 310, in another suitable location, or a combination thereof.

Network interface 380 includes a network channel 382 that provides an interface to devices that are external to information handling system 300. In a particular embodiment, network channel 382 is of a different type than peripheral interface 372 and network interface 380 translates information from a format suitable to the peripheral channel to a format suitable to external devices.

In a particular embodiment, network interface 380 includes a NIC or host bus adapter (HBA), and an example of network channel 382 includes an InfiniBand channel, a Fibre Channel, a Gigabit Ethernet channel, a proprietary channel architecture, or a combination thereof. In another embodiment, network interface 380 includes a wireless communication interface, and network channel 382 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 382 can be connected to an external network resource (not illustrated). The network resource can include another information handling system, a data storage system, another network, a grid management system, another suitable resource, or a combination thereof.

BMC 390 is connected to multiple elements of information handling system 300 via one or more management interface 392 to provide out of band monitoring, maintenance, and control of the elements of the information handling system. As such, BMC 390 represents a processing device different from processor 302 and processor 304, which provides various management functions for information handling system 300. For example, BMC 390 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 390 can vary considerably based on the type of information handling system. BMC 390 can operate in accordance with an Intelligent Platform Management Interface (IPMI). Examples of BMC 390 include an Integrated Dell® Remote Access Controller (iDRAC).

Management interface 392 represents one or more out-of-band communication interfaces between BMC 390 and the elements of information handling system 300, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 302 and 304 and procedures that are implemented on the information handling system in response to the executed code.

BMC 390 operates to monitor and maintain system firmware, such as code stored in BIOS/EFI module 342, option ROMs for graphics adapter 330, disk controller 350, add-on resource 374, network interface 380, or other elements of information handling system 300, as needed or desired. In particular, BMC 390 includes a network interface 394 that can be connected to a remote management system to receive firmware updates, as needed or desired. Here, BMC 390 receives the firmware updates, stores the updates to a data storage device associated with the BMC, and transfers the firmware updates to NVRAM 340 of the device or system that is the subject of the firmware update, thereby replacing the currently operating firmware associated with the device or system, and reboots information handling system, whereupon the device or system utilizes the updated firmware image.

BMC 390 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 390, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 390 is included on a main circuit board (such as a baseboard, a motherboard, or any combination thereof) of information handling system 300 or is integrated onto another element of the information handling system such as chipset 310, or another suitable element, as needed or desired. As such, BMC 390 can be part of an integrated circuit or a chipset within information handling system 300. An example of BMC 390 includes an iDRAC, or the like. BMC 390 may operate on a separate power plane from other resources in information handling system 300. Thus BMC 390 can communicate with the management system via network interface 394 while the resources of information handling system 300 are powered off. Here, information can be sent from the management system to BMC 390 and the information can be stored in a RAM or NVRAM associated with the BMC. Information stored in the RAM may be lost after power-down of the power plane for BMC 390, while information stored in the NVRAM may be saved through a power-down/power-up cycle of the power plane for the BMC.

Information handling system 300 can include additional components and additional buses, not shown for clarity. For example, information handling system 300 can include multiple processor cores, audio devices, and the like. While a particular arrangement of bus technologies and interconnections is illustrated for the purpose of example, one of skill will appreciate that the techniques disclosed herein are applicable to other system architectures. Information handling system 300 can include multiple CPUs and redundant bus controllers. One or more components can be integrated together. Information handling system 300 can include additional buses and bus protocols, for example, I²C and the like. Additional components of information handling system 300 can include one or more storage devices that can store machine-executable code, one or more communications ports for communicating with external devices, and various input and output (I/O) devices, such as a keyboard, a mouse, and a video display.

For purposes of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 300 can include processing resources for executing machine-executable code, such as processor 302, a programmable logic array (PLA), an embedded device such as a System-on-a-Chip (SoC), or other control logic hardware. Information handling system 300 can also include one or more computer-readable media for storing machine-executable code, such as software or data.

The term "user" in this context should be understood to encompass, by way of example and without limitation, a user device, a person utilizing or otherwise associated with the device, or a combination of both. An operation described herein as being performed by a user may therefore be performed by a user device, or by a combination of both the person and the device.

As used herein, a hyphenated form of a reference numeral refers to a specific instance of an element and the un-hyphenated form of the reference numeral refers to the collective or generic element. Thus, for example, memory module "110-1" refers to an instance of a memory module class, which may be referred to collectively as memory modules "110" and any one of which may be referred to generically as a memory module "110."

Although FIG. 2 shows example blocks of method 200 in some implementations, method 200 may include additional blocks, fewer blocks, different blocks, or differently arranged blocks than those depicted in FIG. 2. Those skilled in the art will understand that the principles presented herein may be implemented in any suitably arranged processing system. Additionally, or alternatively, two or more of the blocks of method 200 may be performed in parallel. For example, blocks 225 and 230 of method 200 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device).

The present disclosure contemplates a non-transitory computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. An information handling system, comprising:
an input/output (I/O) device; and
a Basic Input/Output System (BIOS) configured to:
    perform an I/O health check of the I/O device of the information handling system during a boot process of the information handling system;
    gather I/O health check data from the I/O health check performed during the boot process of the information handling system, wherein the I/O health check data includes Double Data Rate (DDR) data; and
    determine a health status of the information handling system according to a set of criteria that includes a DDR threshold, wherein the health status is based on the I/O health check data including the DDR data.

2. The information handling system of claim 1, wherein the I/O health check data is logged in a baseboard management controller.

3. The information handling system of claim 1, wherein the I/O device is a Dual In-Line Memory Module (DIMM).

4. The information handling system of claim 3, wherein the DIMM is a fifth-generation double data rate (DDR5) DIMM.

5. The information handling system of claim 1, wherein the DDR data is used to generate a database of DDR margins.

6. The information handling system of claim 1, wherein the I/O health check includes monitoring a parameter associated with the I/O device that includes one of a command/address bus write leveling, a data bus read/write level, a timing margin, and a read/write voltage margin.

7. The information handling system of claim 1, wherein the health status of the information handling system includes one of healthy or marginal.

8. The information handling system of claim 1, wherein when the health status of the information handling system is marginal, then provide a recommendation to improve the health status of the information handling system.

9. A method comprising:

performing, by a Basic Input/Output System (BIOS), an input/output (I/O) health check of an I/O device of an information handling system during a boot process of the information handling system;

gathering I/O health check data from the I/O health check performed performed during the boot process of the information handling system, wherein the I/O health check data includes Double Data Rate (DDR) data; and determining a health status of the information handling system according to a set of criteria that includes a DDR threshold, wherein the health status is based on the I/O health check data, wherein the I/O health check data is logged in a baseboard management controller (BMC) including the DDR data.

10. The method of claim 9, further comprising monitoring for an excursion using the I/O health check data.

11. The method of claim 9, wherein the I/O device is a Dual In-Line Memory Module (DIMM).

12. The method of claim 11, wherein the DIMM is a fifth-generation double data rate (DDR5) DIMM.

13. The method of claim 9, wherein the DDR data is used to generate a database of DDR margins.

14. The method of claim 9, wherein the I/O health check includes monitoring a parameter associated with the I/O device that includes one of a command/address bus write leveling, a data bus read/write level, a timing margin, and a read/write voltage margin.

15. The method of claim 9, wherein the health status of the information handling system includes one of healthy or marginal.

16. The method of claim 9, wherein when the health status of the information handling system is marginal, then providing a recommendation to improve the health status of the information handling system.

17. A non-transitory computer-readable medium to store instructions that are executable to perform operations comprising:

performing an input/output (I/O) health check of an I/O device of an information handling system during a boot process of the information handling system;

gathering I/O health check data from the I/O health check performed during the boot process of the information handling system, wherein the I/O health check data includes Double Data Rate (DDR) data; and determining a health status of the information handling system according to a set of criteria and based on the I/O health check data including the DDR data.

18. The non-transitory computer-readable medium of claim 17, wherein the I/O health check data is logged in a baseboard management controller.

19. The non-transitory computer-readable medium of claim 17, wherein the I/O device is a Dual In-Line Memory Module.

20. The non-transitory computer-readable medium of claim 17, wherein the I/O health check includes monitoring a parameter associated with the I/O device that includes one of a command/address bus write leveling, a data bus read/write level, a timing margin, and a read/write voltage margin.

* * * * *